(12) United States Patent
Conklin et al.

(10) Patent No.: US 6,587,530 B1
(45) Date of Patent: Jul. 1, 2003

(54) METHOD AND APPARATUS FOR SIGNAL INTEGRITY VERIFICATION

(75) Inventors: Troy R. Conklin, Hillsboro, OR (US); Harold B. Hutchison, Jr., Forest Grove, OR (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 09/680,819

(22) Filed: Oct. 5, 2000

(51) Int. Cl.$^7$ .............................. H04L 25/00; G06F 1/07
(52) U.S. Cl. ........................................ 375/372; 359/264
(58) Field of Search .............................. 375/372, 224, 375/225, 316, 324, 327, 355, 371; 327/165, 291, 26, 37; 359/118, 264

(56) References Cited

U.S. PATENT DOCUMENTS

| | | | |
|---|---|---|---|
| 5,548,399 A | * | 8/1996 | Takai et al. ................. 356/218 |
| 5,737,369 A | * | 4/1998 | Retzer ........................ 375/346 |
| 6,061,396 A | | 5/2000 | Everitt |
| 6,107,891 A | | 8/2000 | Coy |
| 6,366,374 B2 | * | 4/2002 | Bradshaw et al. .......... 359/110 |

OTHER PUBLICATIONS

Wavecrest Corporation, Technical Papers and Presentations, www.wavecrest.com/technical/papers.html.
Wilstrup, Jan, *A Method of Serial Data Jitter Analysis Using One–Shot Time Interval Measurements*, T11/98–130v0, www.wavecrest.com/technical/papers.html.
Wilstrup, Jan, *A Method of Serial Data Jitter Analysis Using One–Shot Time Interval Measurements*, Feb. 5, 1998, www-.wavecrest.com/technical/papers.html.

* cited by examiner

*Primary Examiner*—Khai Tran
(74) *Attorney, Agent, or Firm*—Pryor A Garnett; Dilworth Paxson LLP

(57) ABSTRACT

The present invention provides a signal integrity measurement method and apparatus which allows for signal characteristics to be measured by obtaining samples taken at the midpoint of the data stream. The invention provides a measurement device that is suitable for use in the field to provide a measurement of signal characteristics within transmitted data streams. The invention is particularly suitable for field measurement of signal characteristics of data streams or continuous in-line monitoring of signal characteristics within transmitted data streams. The signal characteristics include, but are not limited to eye opening jitter, noise, slope efficiency, average power and peak-to-peak amplitude.

24 Claims, 15 Drawing Sheets

METHOD AND APPARATUS FOR SIGNAL INTEGRITY VERIFICATION

BACKGROUND OF THE INVENTION

1. Technical Field

The present invention relates to an apparatus and system that measures and outputs a first order assessment of signal characteristics and a determination of signal quality and integrity within telecommunications networks such as gigabit and multi-gigabit networks.

2. Description of the Prior Art

Gigabit and multi-gigabit Local Area Network (LAN) and Storage Area Network (SAN) markets are rapidly emerging industries, which are entirely dependent on inexpensive network media components, including both copper and fiber optics technologies. Since the late 1980's, the available high-speed fiber optic components have been inexpensive screened parts taken from compact disk (CD) production lines. CD laser technology is based on edge emitting Fabry-Perot laser diodes, which offer data communications bandwidth from hundreds of megabit/sec to gigabit/sec. Other low-cost technologies, such as super-luminescent light-emitting-diode (LED), have been incapable of achieving gigabit link speeds. Since LAN and SAN markets demand low cost, the technically more mature edge emitting Fabry-Perot and distributed Bragg reflector laser diodes that are used in telecommunications applications were not adopted.

The CD laser technology was embraced by a number of suppliers, who applied their respective level of sub-component supplier selection and parts screening processes. Some CD laser vendors did an excellent job in selecting sub-component suppliers, while others applied various levels of parts screening. In the end, low cost CD lasers have a fundamental characteristic: gradual reduction in "relaxation oscillation frequency." Over time, these components experience un-damped ringing, resulting in drastically increased, measurable jitter on the link (as measurable by a digital-sampling oscilloscope). Some CD laser vendors have had to undergo full-scale replacement of their product in the field, while others have stated that it is just a matter of time before their product suffers from the same degradation. This represents several years of production from multiple suppliers, all of which requires support in the field.

Laser media suppliers are transitioning to Vertical Cavity Surface Emitting Laser (VCSEL) diode based technology, which is specifically designed and manufactured for the low cost, LAN and SAN data communications markets. This will allow much better resolution of issues, since vendors are no longer leveraging a fundamentally different, high volume, commodity industry. VCSEL technology has the potential to offer data communications bandwidth from 1 to 5+, gigabit/sec, and offers the initial promise to attain very high reliability figures similar to the early days of the telecommunications industry. On the cautionary side, VCSEL technology is still relatively new, and primary failure modes are still being characterized. Additionally, VCSEL manufacturers are transitioning from ion-implant confined device structures to oxide confined device structures. These device enhancements, coupled with overall manufacturing/materials cost cutting efforts and higher data rate applications operating at 2 gigabit/sec, represent areas of risk which may impact life-time characteristics compared to current practice and theoretical understanding.

However, beyond laser physics, there are a whole host of other materials, design, and manufacturing issues which have the potential to adversely impact signal integrity. Field service groups have already experienced instances of cracked lenses within the laser assembly, glue that fails over time, glue that has not been fully cured, as well as spattered glue on the lens, all of which which darken the transmitted signal at some time after installation.

The primary failure mode requiring new field instrumentation is degradation of the transmitting device, including the laser diode and associated drive electronics. This failure mode does not change average or peak signal power levels, but rather results in increased "jitter" within the digital signal. "Jitter" is an industry term which refers to the amount of variance within the rising and falling edges of the digital signal. As seen in FIG. 2, Jitter 23 is measured at the receiver, and appears on a digital-sampling oscilloscope as though the rising and falling edges of the signal are smeared across a broad area of the overall duty cycle. This smearing results in a more closed eye opening 21 and may be quantified by expressing the eye as the "percent eye closing" or "%eye." Noise 24 is the signal unrelated to the signal of interest.

At the early stage of transmitter failure, the link may experience occasional bit errors, which may only happen with specific data patterns within an IO data-gram sent over the link, or with heavy IO load levels transmitted over the link. At the later stages of transmitter failure, the link saturates with errors, and becomes non-operational for transferring IO. For both of these increased transmitted "jitter" cases, the optical power level is within the original manufacturer specification, and field service is not able to use an optical power meter to distinguish an error free link from a link that is unusable. At the present time, there is no direct measurement technique suitable for use in the field which provides a measurement of signal integrity or transmitted "jitter" within gigabit and multi-gigabit networks.

Without this capability, field service is placed in the difficult position of trouble-shooting the onset of intermittent errors using only customer data transmitted through the network and analysis of error counters throughout the system. Trouble-shooting intermittent errors within an on-line system is very difficult, due to the random nature of hitting the right data pattern or load level which causes the error, as well as collecting and analyzing the correct set of error counter data, which identifies the most likely failing component or components. This error-counter analysis procedure is extremely time consuming and results in the identification of a small number of "most likely" failing component(s), rather than accurately identifying "the" one or more failing components. Additionally, this analysis depends heavily on the judgement of the field service person, who must make the decision whether to expedite a field service action based on a few increments in error counters or wait to see what happens next.

Once field service has the opportunity to take a portion of the system down for maintenance, they have a short period of time to complete any further trouble shooting to narrow the list of most likely failing components, replace the fewest number of components, and return the system to operation. It is at this point in time, that field service requires a low-cost, rapid, and deterministic pass-fail test to isolate the failing component. Without this capability, field service has no way to verify quality of the components being placed back into operation, and the system is exposed to the risk of oscillating through many cycles of maintenance actions. In the case of intermittent errors, this is especially unacceptable since it may take a long period of time to confirm whether the problem was fixed, based on the likelihood hitting the data pattern or load level, which triggers the error.

Automated and continuous collection of on-line diagnostic data has, to some extent, helped to reduce troubleshooting time and improve accuracy. However, even with improvements in on-line diagnostics data collection, there is a need in the industry for a means to directly measure signal integrity in the field. Whether in the form of a portable, hand held field unit or incorporated into the communications equipment itself, the ability to rapidly evaluate the optic signal at the customer site is a key quality assurance factor.

All of these criteria point to the need for a means to directly measure signal integrity both in-line and in the field. Additionally, many of the risk factors apply equally to copper-based gigabit media.

SUMMARY OF THE INVENTION

The present invention provides a signal integrity measurement method and apparatus, wherein the signal characteristics of a telecommunications data stream are measured based upon obtaining at least one sample measurement at the midpoint of the data stream. The signal characteristic determined by this method is preferably one or more of: percentage of eye (%eye) opening of the data stream, jitter, noise, slope efficiency, average power and peak-to-peak amplitude. This information is preferably also stored, and as necessary, displayed. In addition the invention provides a method whereby a first indication is displayed if the signal characteristic is within a first range; a second indication is displayed if the signal characteristic of the data stream is within a second range; and a third indication is displayed if the signal characteristic of the data stream is within a third range.

Another aspect of the invention is an apparatus and a system related to the aforementioned method.

Yet another aspect of the invention is an apparatus such as a hand held device, a transceiver and host system, or a transceiver alone, comprising an analog-to-digital converter, a clock recovery unit, a midpoint sampler, and a signal characteristic converter.

The method and apparatus of the present invention provide a measurement device that is suitable for use in the field to provide a measurement of signal characteristics within transmitted data streams. The method, and apparatus system are also suitable for field measurement of signal characteristics of data streams or continuous in-line monitoring of signal characteristics within transmitted data streams. The signal characteristic preferably includes, but is not limited to eye opening, jitter, noise, slope efficiency, average power and peak-to-peak amplitude.

Other features and advantages of this invention will become apparent from the following detailed description of the presently preferred embodiment of the invention, taken in conjunction with accompanying drawings.

DESCRIPTION OF THE PREFERRED EMBODIMENT

Technical Background

The present invention relates to an apparatus and system that measures and outputs a first order assessment of signal integrity within telecommunications networks such as, but not limited to, Fibre Channel and Gigabit Ethernet gigabit and multigigabit networks. Fibre Channel is the general name of an integrated set of standards developed by the American National Standards Institute (ANSI). A novel aspect of the present invention is the ability to troubleshoot significant degradation of signal quality by using a handheld device or an in-line continuous monitor of signal quality.

Figure 1:
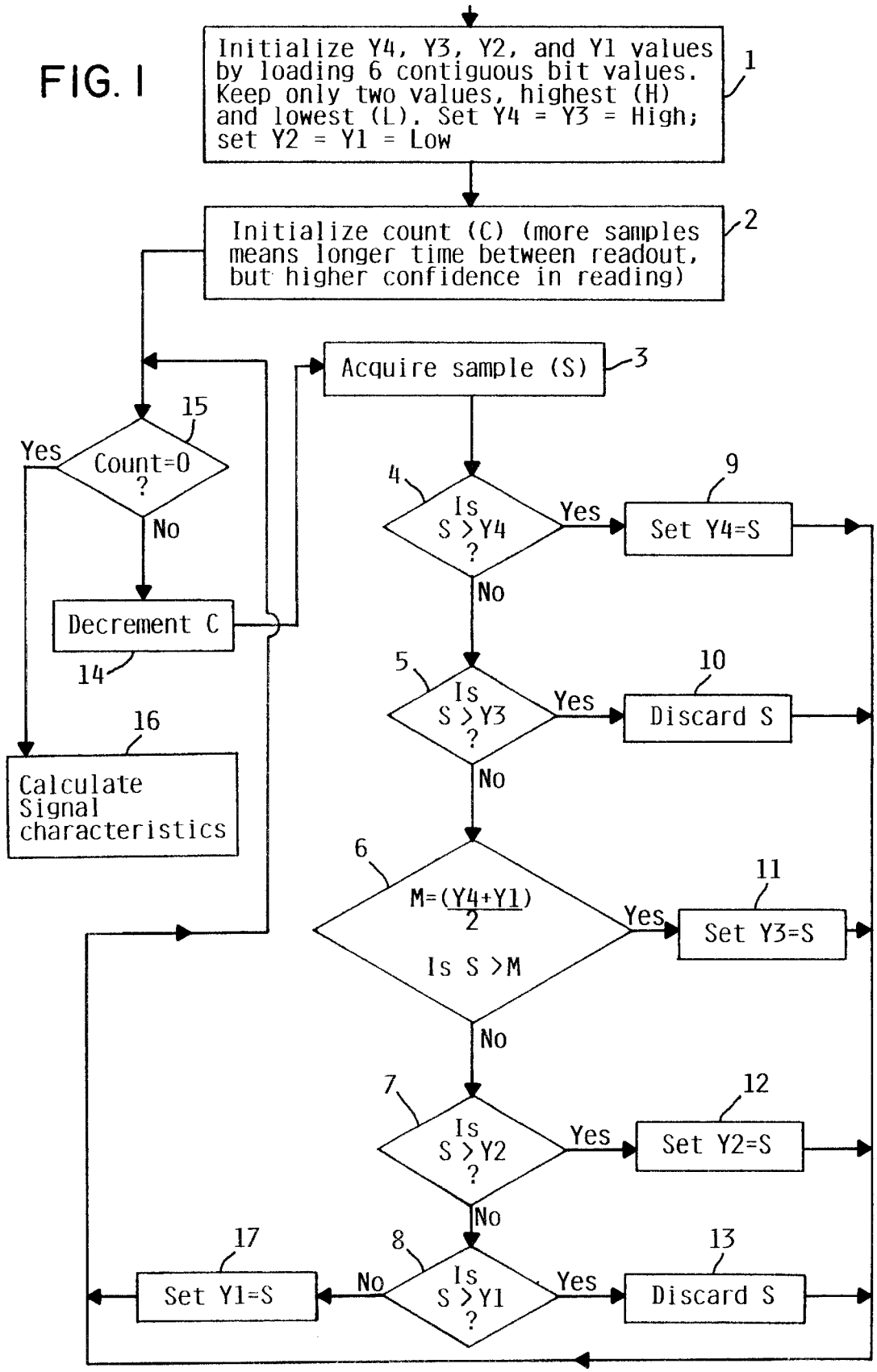
FIG. 1 is a flowchart of the invention according to the preferred embodiment of this invention, and is suggested for printing on the first page of the issued patent.

FIG. 1 is a flowchart of the presently preferred embodiment of the invention. The contiguous samples are stored, step 1, into registers. The next step is to initialize the counter, step 2, which indicates the number of samples that are to be taken. The more samples that are taken, the longer it takes between readouts but the accuracy of the obtained readings is increased. A sample of the waveform is taken at the midpoint, step 3. The sample (S) is compared to the stored Y4, Y3, Y2 and Y1 values, steps 4–8. If S is greater than the Y or M values, the value of Y is replaced with the S value, steps 9–12. If S is less than all of the Y values, step 8, S replaces Y1, step 17. If S is greater than Y1 however, the sample is discarded. This process continues until a predetermined number of samples are acquired, at which time the counter is equal to 0, step 15. If the counter is not equal to 0 the counter is decremented, step 14 and another sample is obtained, step 3 repeated. The signal characteristics, such as %eye, noise and jitter, are calculated, step 16, from the stored values after the predetermined number of samples are acquired.

These values can be displayed in a number of different manners, such as in the form of actual numeric values, or as a histogram, or it can be determined if the values are within either of the acceptable, cautionary or critical ranges.

Overview

Fiber optic link health assurance primarily relies on the measurement of the optic signal strength. This is critical for the obvious reason that sufficient power must be present to allow the receiver to properly interpret the signal. However, the presence of a strong signal does not guarantee that the signal has good integrity or quality. One universally applied tool for the measurement of signal quality has been the eye diagram. For example, the Fibre Channel Physical Layer specification calls for a minimum of 57% eye opening for 1063 Mb/s data rates using short wave laser transmitters. Unfortunately, eye diagrams require that relatively expensive high-speed oscilloscopes be available for field applications, which is impractical.

Figure 2:
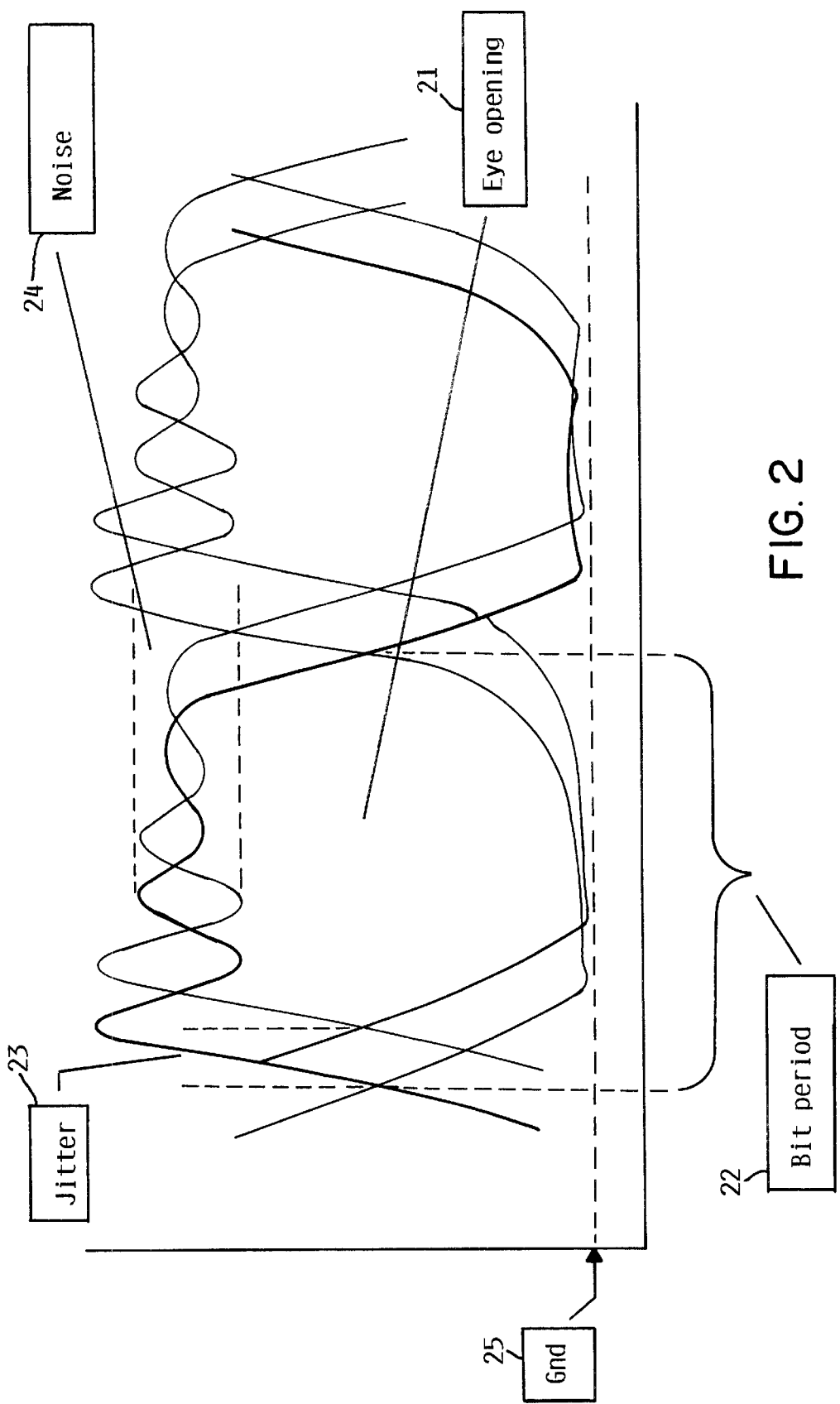
FIG. 2 is a diagram of an unfiltered eye.

There is a strong relationship between the signal noise level and the percentage eye opening. This relationship can be utilized to give a quick measure of the eye quality, and hence the health of the optic link. FIG. 2 shows a stylization of an unfiltered eye as might be shown on a high-speed oscilloscope, as well as noise 24, bit period 22 and jitter 23. The image is acquired by overlaying successive traces one upon another, while the scope is in a "persistence" mode. The trace is all positive; that is, the entire signal is displayed above the ground reference (GND) 25, since there is no "negative light." Also, the oscillation in the logic one level would normally not be visible when viewed with the bandwidth filters on due to the filter cutoff frequency. The transmitted square wave normally appears as a sine wave.

The bit period is the time between two adjacent pulses and its base unit is the second. The bit period depends on the data rate and can be extracted from a Fibre Channel data stream via a Phase Locked Loop (PLL). Phase Locked Loop is a circuit in which a phase comparator will compare the phase of an input signal and the voltage controlled oscillator (VCO) in the loop, and is readily available at gigabit speeds. The output of the phase comparator is filtered and the resulting voltage controls the VCOs frequency. This causes the loop to stabilize in such a state that the phase of the input signal and the VCO are equal.

The noise measurement requires a combination of a sample-and-hold circuit, and a flash analog-to-digital converter (ADC) capable of sampling at the data rate of the input signal. This is a common feature of today's high-speed digital scopes.

An important aspect of the present invention is that the critical information that was formerly obtainable only by use of a high-speed oscilloscope, can now be obtained by acquiring samples at the waveform's midpoint. As a result, circuit complexity is considerably reduced which facilitates the invention's use as a hand held device or an in-line monitor for signal quality/integrity.

Figure 3:
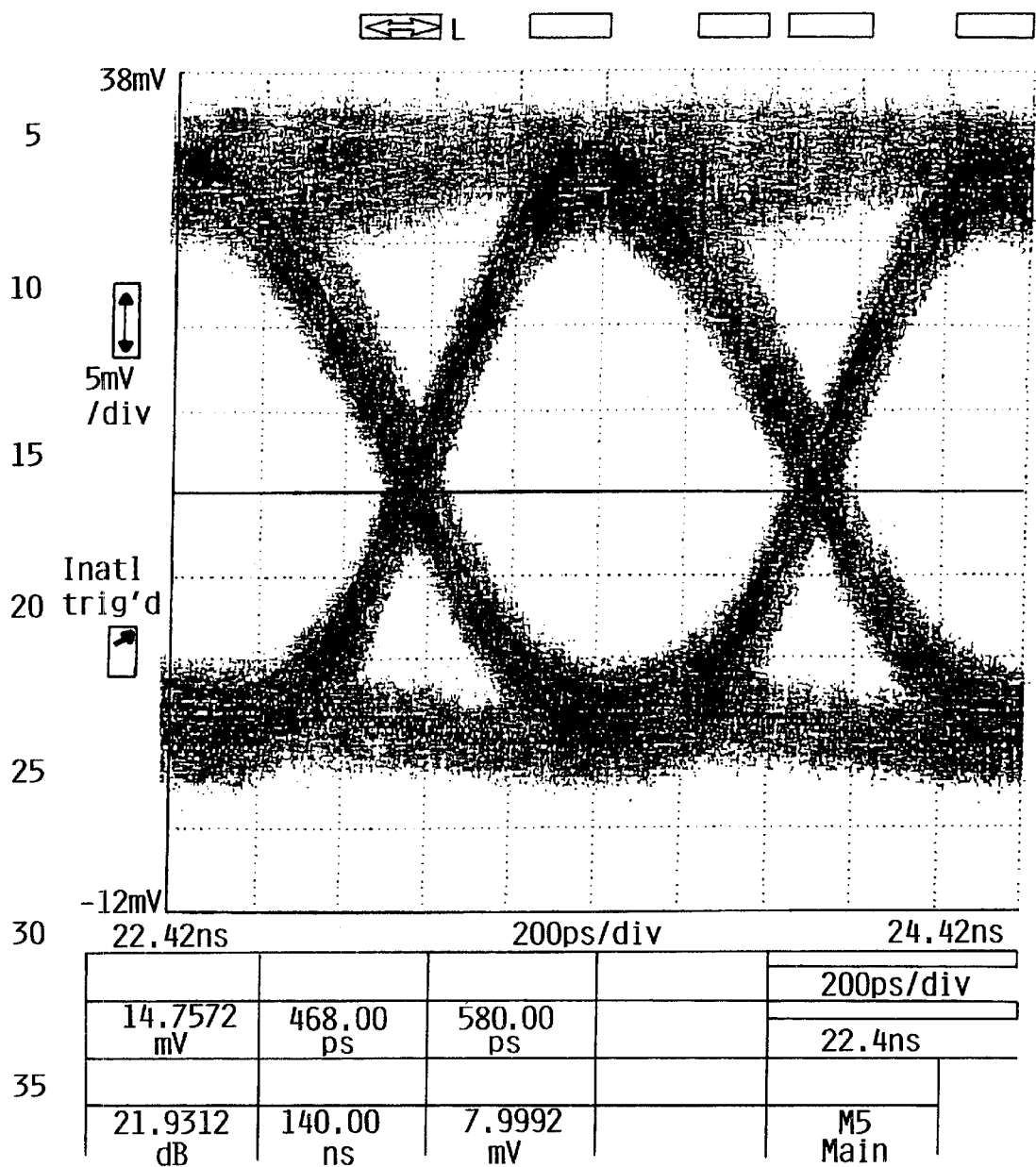
FIG. 3 is a picture of an analog eye opening.
Figure 4:
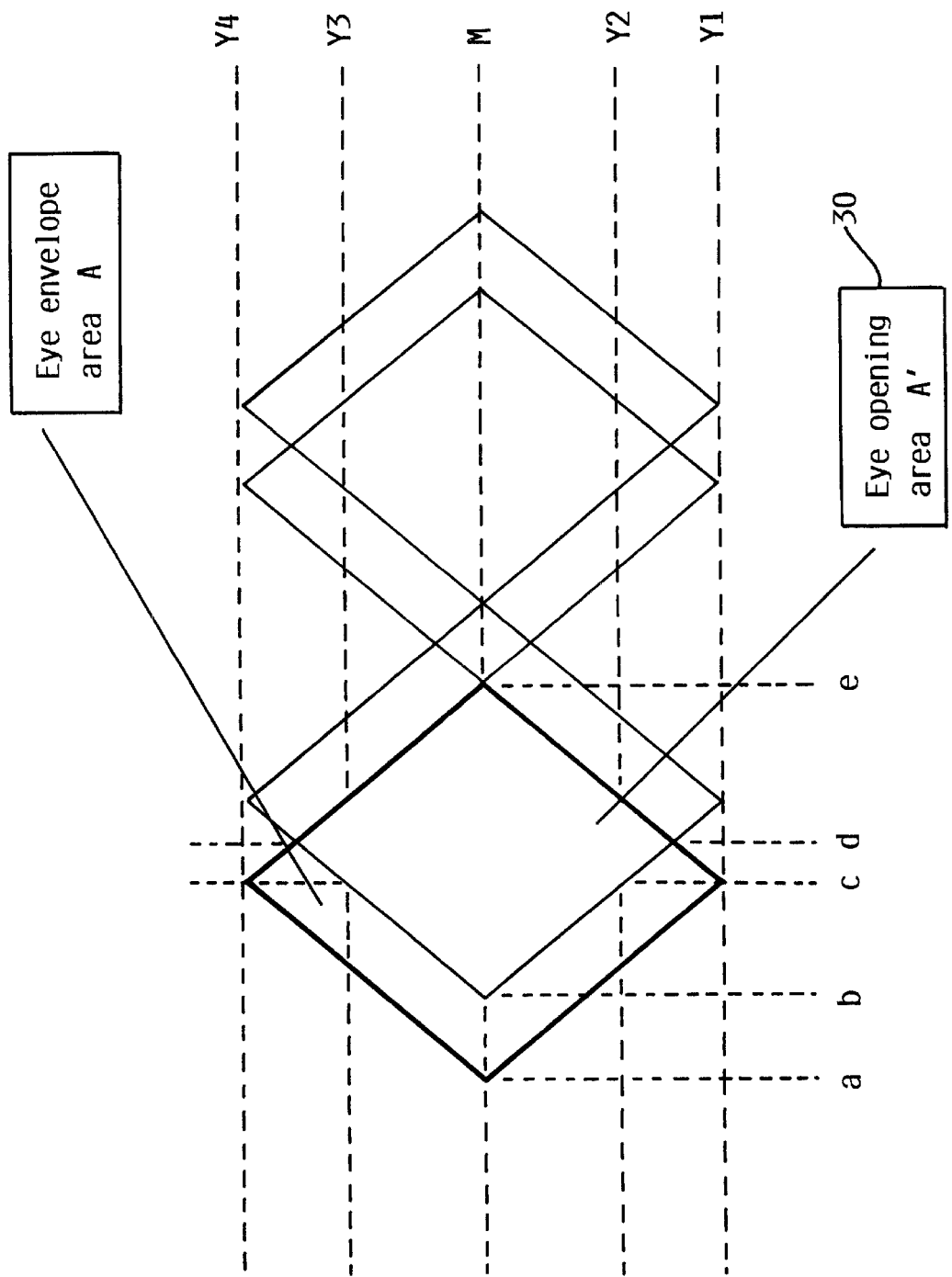
FIG. 4 is a graph showing the basis for a geometerical estimate of the eye opening of FIG. 3.
Figure 5A:
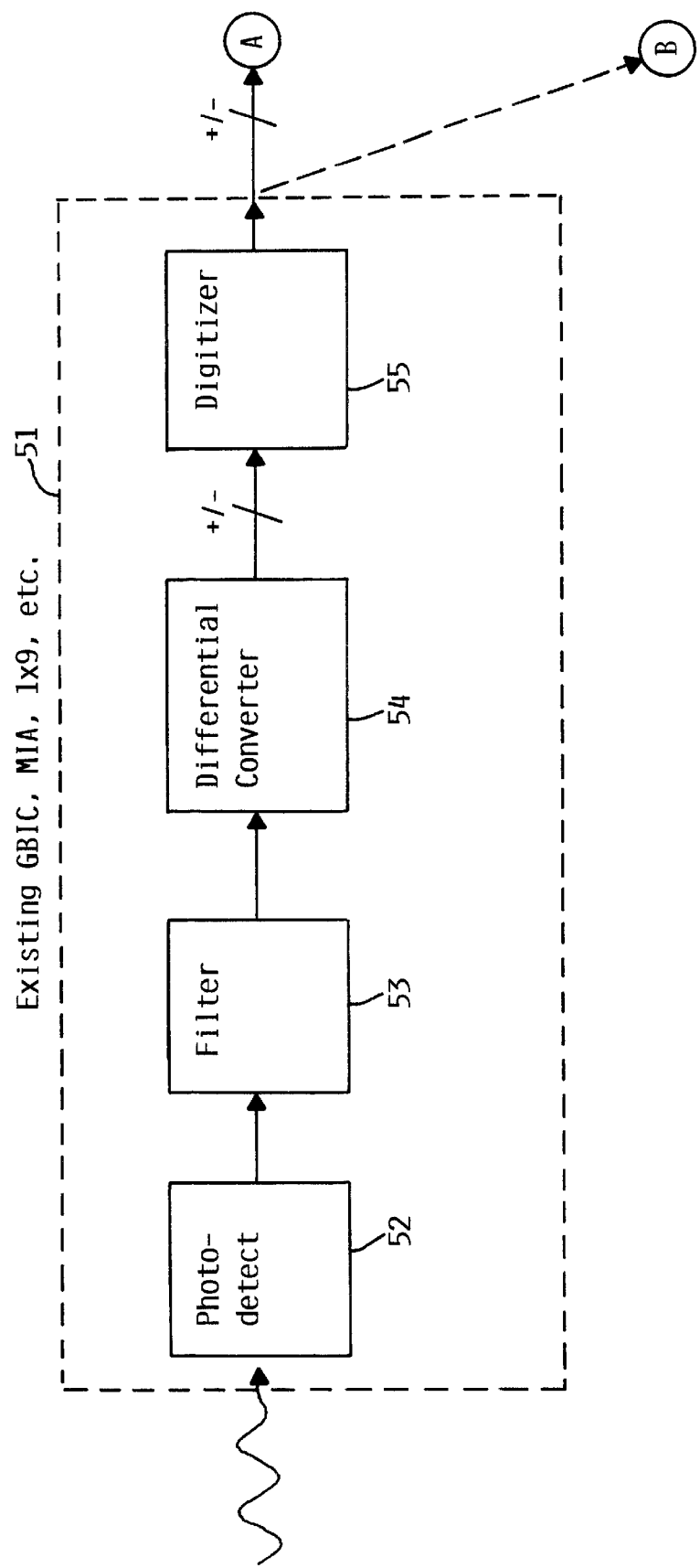
FIG. 5 is a block diagram to show a generalization of the circuitry that could be used to implement the present invention.
Figure 5B:
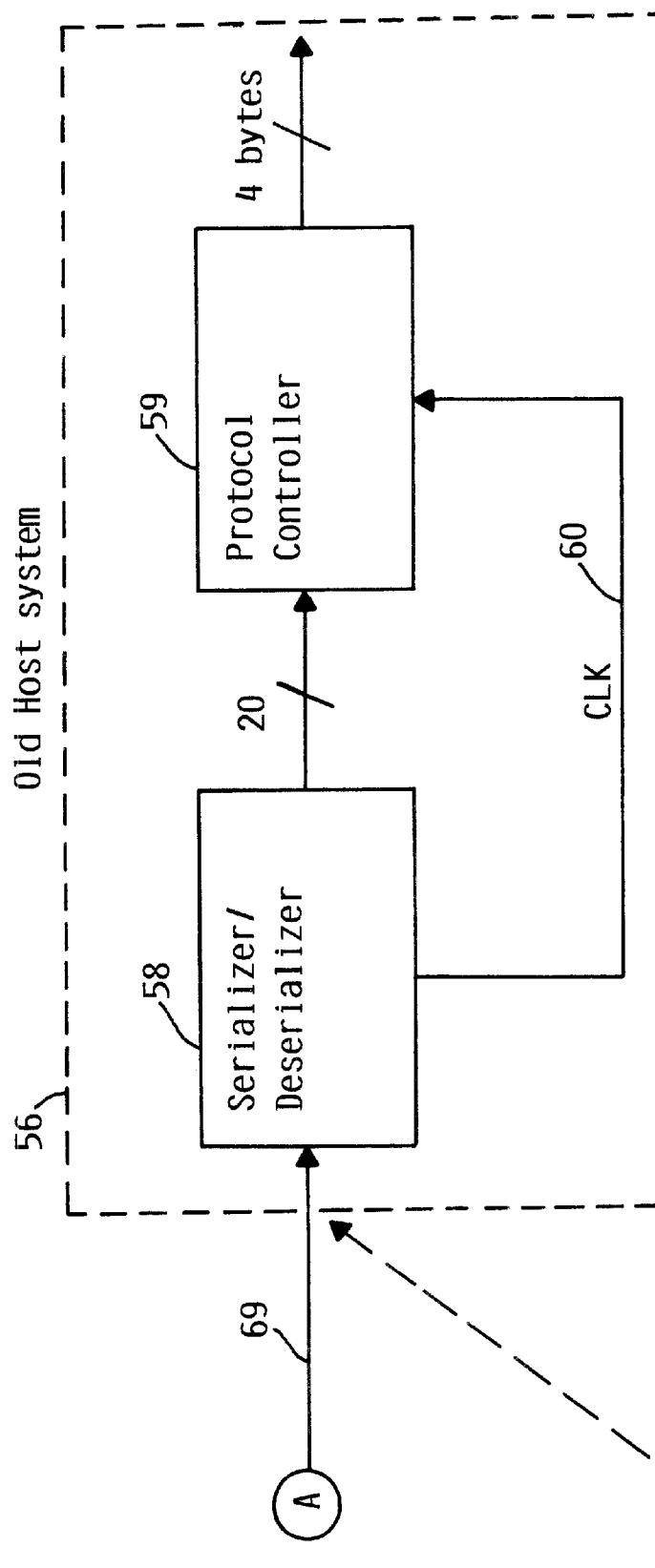
Figure 5C:
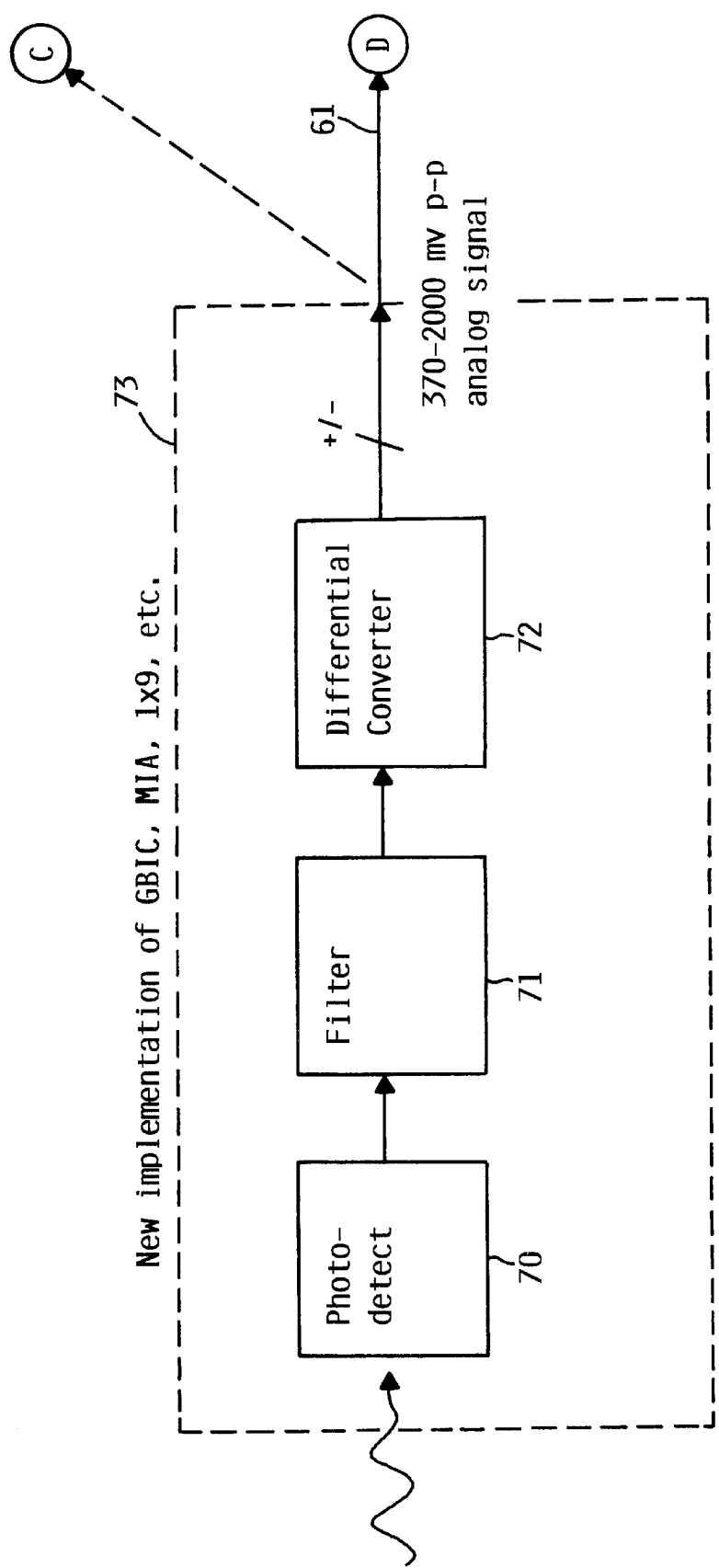
Figure 5D:
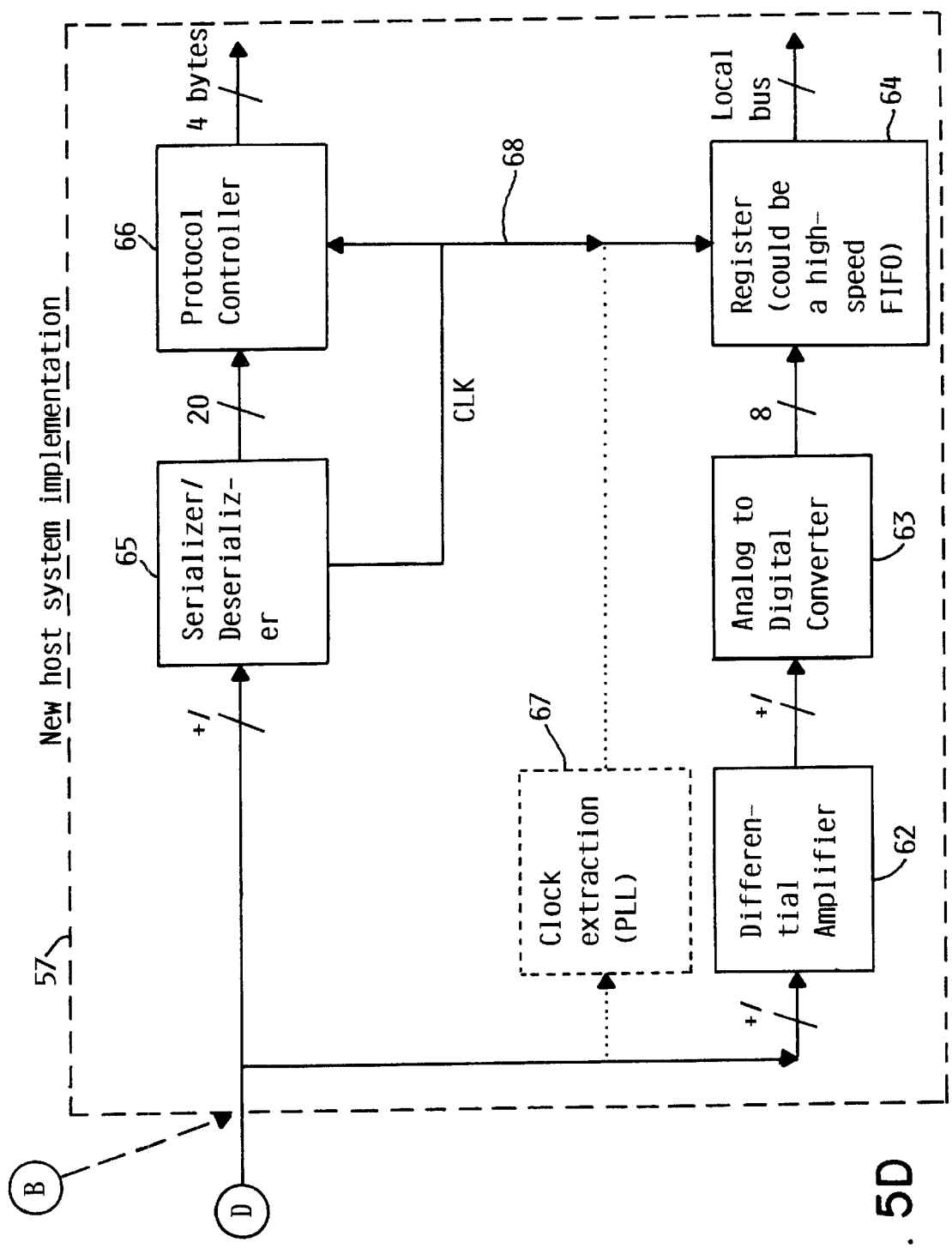

An aspect of the present invention is the relationship noise has to the total area enclosed in an eye envelope. FIG. 4 shows an approximation of the analog eye of FIG. 3, from which the relationship can be derived. The initial assumption is that the filtered waveform is essentially symmetrical, and that it is fundamentally a sine wave. Note that as eye quality degrades, it becomes less symmetrical, which affects the derivations, but the invention is still effective for first order approximations.

As an assumption for eyes of good quality, the rising edge slope is equal to that of the falling edge, and therefore calculations of the percentage eye opening and noise measurements can be made by obtaining the abscissa of the polygons (or the upper and lower extremes) over time. Eyes that have poor quality will generally have fall times that are greater than rise times, but this method is still adequate for a first order approximation. There are several different techniques available to make approximations or first order measurements for signal quality. The measurements of the percentage of eye opening (%eye), jitter and noise can be determined geometrically using algebra, or by the use of calculus.

Eye Opening Approximation

With reference to FIG. 4, the percent eye, noise and jitter are calculated as follows using one of two derivations: a Geometric derivation or a Calculus derivation.
Method 1 Geometric Derivation:
x=(a to c)=(c to e)=½ bit period;
$\Delta x$=(a to b)=jitter;
$\Delta x/2$=(c to d);
x'=(d to e)=(c to e)−(c to d)=x−$\Delta x$/2;
y=Y4−M;
$\Delta y$=Y4−Y3=Y2−Y1=noise;
M=(Y4+Y1)/2=(Y3+Y2)/2=midpoint of the envelope=average power;

Amp=Y4−Y1=peak-to-peak amplitude.

In light of the above, the percentage of eye opening 30 (%eye) can be expressed as follows:

$$\%eye = (\text{Eye opening/Eye envelope})*100 = A'/A*100.$$

But: A'=4[(x−$\Delta x$/2)(y−$\Delta y$/2)/2]=2(x−$\Delta x$/2)(y−$\Delta y$/2)
And: A=4[x*y/2]=2xy
So:

$$\%eye = \frac{2(x-\Delta x/2)(y-\Delta y/2)*100}{2xy} = \frac{(x-\Delta x/2)(y-\Delta y/2)*100}{xy}$$

Therefore, %eye=[1−½($\Delta x/x$)−½($\Delta y/y$)+¼($\Delta x/x$)($\Delta y/y$)]*100.  (Formula 1)

Note that $\Delta y$ is equal to the noise present in the signal at the sample point, and can be calculated from the logic 1 level by Y4−Y3, or from the logic 0 level by Y2−Y1. Also note that x is known; specifically for Fibre Channel 1 Gbaud traffic, x is equal to 470.5 ps; for 2 Gbaud FC traffic, x is equal to 235.25 ps, etc. The remaining independent variable, $\Delta x$ (jitter), can be determined by the principle of similar triangles, assuming that the slope of the rising edge is constant.

Slope=($\Delta y/2$)/($\Delta x/2$)=y/x=(Y4−M)/470.5 ps $\Delta y/\Delta x$=(Y4−M)/470.5 ps,
So: $\Delta x$=(470.5 ps)($\Delta y$)/(Y4−M)
=(470.5 ps)($\Delta y$)/(Y4−((Y4+Y1)/2)) # substituted M
=(470.5 ps)(Y4−Y3)/(Y4/2−Y1/2) # substituted $\Delta y$; simplified denominator.
=(470.5 ps)(Y2−Y1)/(Y4/2−Y1/2) # equivalent statement, using logic 0 noise.

Jitter can now be approximated in terms of independent variables, which are determinable at the midpoint of the acquired waveform.

$\Delta x/x$=((470.5 ps)(Y4−Y3)/(Y4/2−Y1/2))/470.5 ps

=(Y4−Y3)/(Y4/2−Y1/2)

=2(Y4−Y3)/(Y4−Y1)

=2(Y2−Y1)/(Y4−Y1)#[since (Y4−Y3)=(Y2−Y1)]

$\Delta y/y$=(Y4−Y3)/(Y4/2−Y1/2)

=2(Y4−Y3)/(Y4−Y1)

=2(Y2−Y1)/(Y4−Y1)#[since (Y4−Y3)=(Y2−Y1)]

This shows that the ratio of noise-to-signal is equal to that of jitter-to-bit period. Further, since from Formula 1:

%eye=[1−½($\Delta x/x$)−½($\Delta y/y$)+¼($\Delta x/x$)($\Delta y/y$)]*100 which can be expressed as a function of "logic one" noise,

%eye=[1−2(Y4−Y3)/(Y4−Y1)+¼($\Delta x/x$)($\Delta y/y$)]*100

%eye=[1−2(Y4−Y3)/(Y4−Y1)+(Y4−Y3)$^2$/(Y4−Y1)$^2$]*100 or as a function of "logic zero" noise,

%eye=[1−2(Y2−Y1)/(Y4−Y1)+(Y2−Y1)$^2$/(Y4−Y1)$^2$]*100

In effect, this is simply: %eye=[1−2*(noise/Amp)+(noise/Amp)$^2$]*100

Samples obtained at the midpoint of the bit period yielding Y4, Y3, Y2 and Y1 can be used to calculate:

Noise: the greater of (Y4−Y3) and (Y2−Y1)
Jitter: (470.5 ps)(Y4−Y3) (Y4/2−Y1/2) or equivalently (470.5 ps)(Y2−Y1)/(Y4/2−Y1/2)

Figure 12:
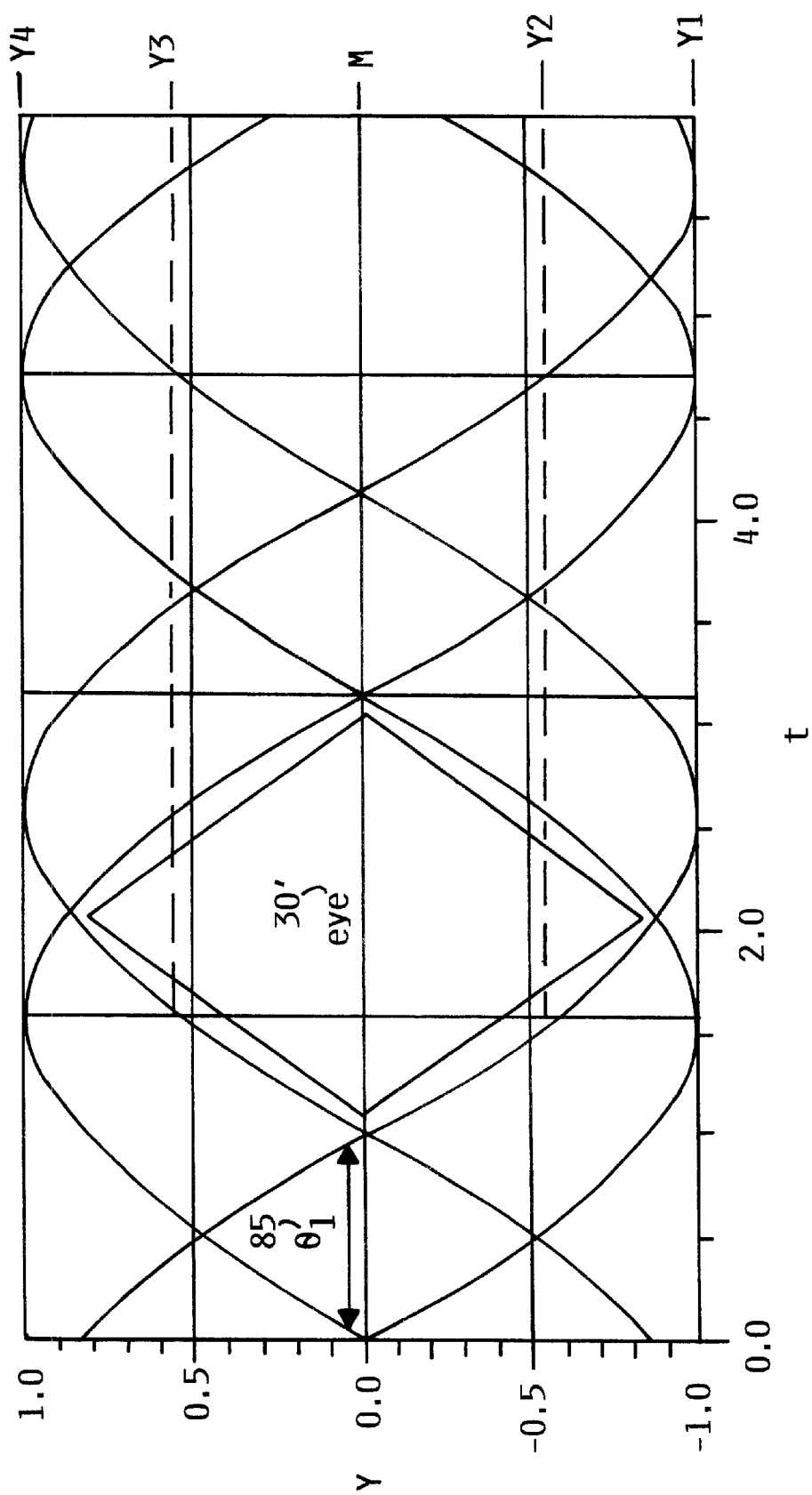
FIG. 12 is a graph showing the basis for a calculus estimate of the eye opening of FIG. 3.

Method 2 Calculus Derivation:

Referring now to FIG. 12 to estimate the eye opening using calculus, one must find the area of the eye 30' as a percentage of the area between a sine and negative sine curve for one-half cycle. θj 85 is the jitter phase. The derivation is as follows:

The first step is to determine θj 85 as a function of Y4 and Y3.

The difference between the sine waves at the clock midpoint is given by:

$$Y4 - Y3 = Y4\left(\sin\left(\frac{\pi}{2}\right) - \sin\left(\frac{\pi}{2} - \theta j\right)\right)$$

Dividing through by Y4 and evaluating the first sin( ) yields:

$$1 - \frac{Y3}{Y4} = \left(1 - \sin\left(\frac{\pi}{2} - \theta j\right)\right)$$

Canceling the 1s:

$$\frac{Y3}{Y4} = \sin\left(\frac{\pi}{2} - \theta j\right) = \cos\theta j \text{ \# by trigonometric identity}$$

$$\text{Arccos}\left(\frac{Y3}{Y4}\right)\theta j$$

The second step is to determine %eye as a function of θj.

First derive the maximal eye area:

$$A_{\max} = 2\int_{t=0}^{\pi} \sin t\, dt = 4$$

Second, shift the limits of integration by θj 85, and derive the jittered eye area:

$$A = 4\int_{t=0}^{\frac{\pi - \theta j}{2}} \sin t\, dt = 4\left[1 - \sin\left(\frac{\theta j}{2}\right)\right]$$

The third, and final step, is to find %eye as a function of Y4 and Y3.

$$\% \, eye = \frac{A}{A\max} = \frac{A}{4} = \left[1 - \sin\left(\frac{\theta j}{2}\right)\right] * 100$$

Substituting the results from the first derivation:

$$\% \, eye = \left(1 - \sin\left(\frac{\arccos\left(\frac{Y3}{Y4}\right)}{2}\right)\right) * 100$$

Applying half-angle formulas for cos( ) and sin( )

$$\% \, eye = \left(1 - \sqrt{\frac{1 - \cos\left(\arccos\left(\frac{Y3}{Y4}\right)\right)}{2}}\right) * 100$$

$$\% \, eye = \left(1 - \sqrt{\frac{1 - \frac{Y3}{Y4}}{2}}\right) * 100$$

Simplifying the expression under the square root:

$$\% \, eye = \left(1 - \sqrt{\frac{Y4 - Y3}{2Y4}}\right) * 100$$

The values for jitter, noise and %eye can be obtained by the geometric derivation, the calculus derivation or by any other suitable means for determing such signal characteristics from the sample measurements at the midpoint of the data stream.

Hardware Implementation

FIG. 5 is a block diagram that is intended to show a generalization of the existing information flow for an optical to electrical conversion stream, and an alternative method that could incorporate the present invention for capturing optics quality data. The new host system 57 is intended to represent a host-based implementation, useful for continuous in-line signal monitoring. The cross connections represented by the dotted lines are included to indicate that the old GBIC 51 would be accepted by the new host system 57, and that the new GBIC 73 would be accepted by the old host system 56.

Currently the optic stream, in the form of inbound light, is channeled to a photodetector 52 which does the actual conversion from light to current. The resultant electrical representation has the very high frequency content filtered by filter 53 before being converted to a digitized differential signal by differential converter 54 and digitizer 55. This differential signal (+/−Rx) is presented to the output pins of the GBIC (or MIA, 1×9 etc.) which are the input pins to the Host 56. The inbound Rx signal pair is presented to the serializer/deserializer (SERDES) 58 which produces 10 or 20 bits of paralleled data. This wide data is fed to the protocol controller 59, which converts the 10b data to 8b data, and presents it to the system for routing.

One aspect of the current invention seeks to alter this flow. The GBIC 73 presents to new host system 57 proportional (analog) differential signals 61 rather than digitized differential pairs. The SERDES 65 processes this data as above, as long as the signal levels are scaled from 370 to 2000 mV. Additional circuitry 62, then converts the analog differential signal 61 to single-ended data, which can be read by a flash analog-to-digital converter 63 (ADC) and latched by a register 64. If the full-speed clock signal (CLK) 68 is not available external to the SERDES (the extracted clock is usually presented a factor 10× or 20× lower than the link rate), then an additional phased locked loop (PLL) block 67 clocks data into the register 64. The SERDES 65 and PLL block 67 alternatively perform the function of a clock-recovery-unit (CRU). The CRU function can be performed by these and any other suitable means.

The register 64 sits on the host local bus, and can be probed and read by the host firmware as required. The width of the register depends on the width of the local bus and the resolution of the flash ADC (the number of bits). High speed FIFOs are used initially to clock in the first six, contiguous samples to ensure that both a high signal level and low signal level are captured. After those samples are read, following samples can be overwritten without real data loss, since the method seeks only to capture the extremes of both the logic one and logic zero levels. Since the data rate is over 1 GHz, an adequate sample size is obtained in only a few seconds, even if just a small percentage of signals are being recorded by the firmware.

Figure 9:
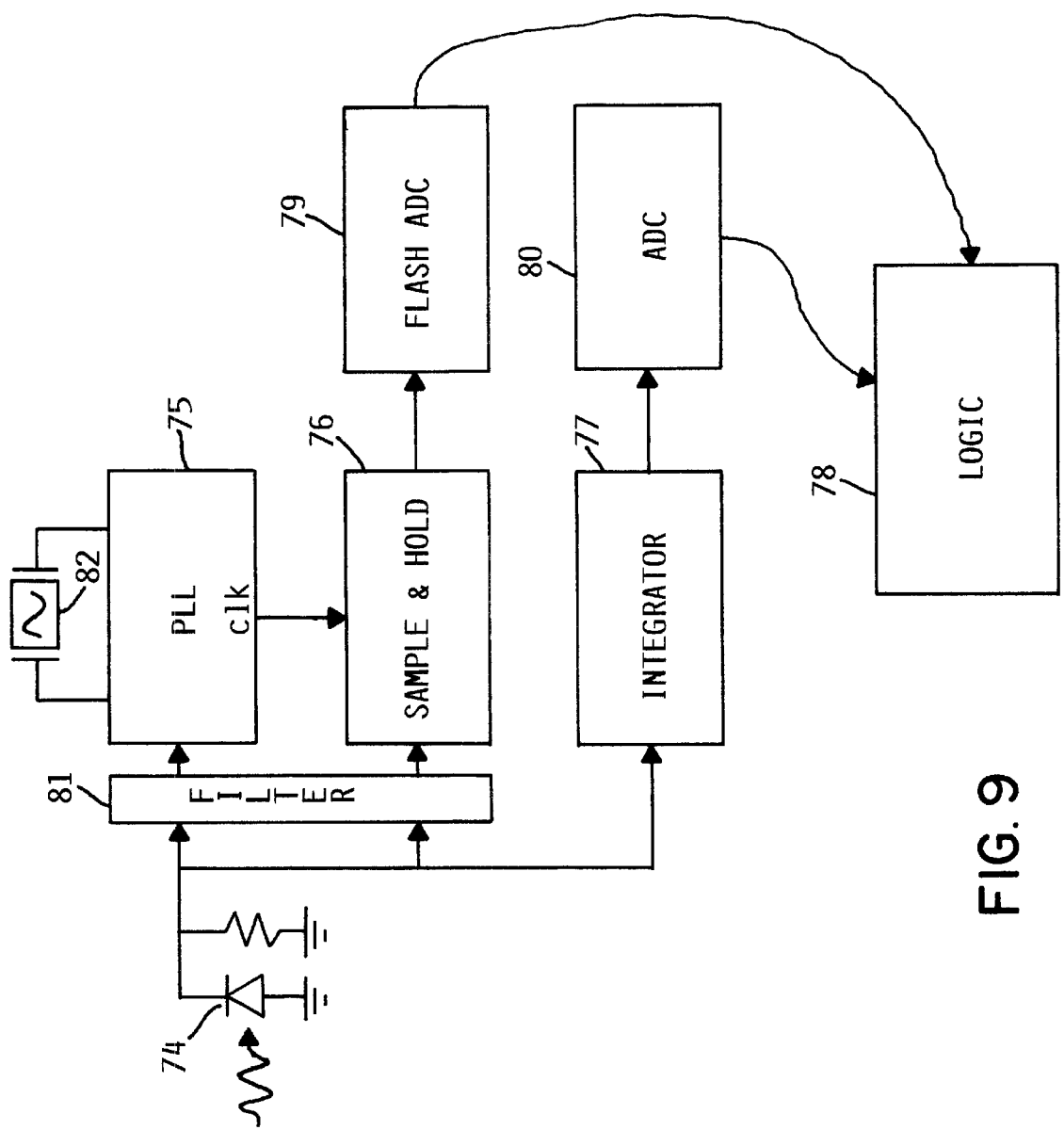
FIG. 9 is a block diagram of the hand-held implementation of the present invention.

FIG. 9 is a block diagram of a stand-alone, hand-held unit that incorporates much of the same structure, but without the SERDES and without the conversion of the single-ended output from the filter to analog differential. Photo-detector 74 converts the incoming light to an electrical current. The modulated signal is applied to the PLL 75, which recovers the clock. This is used to gate the S&H 76/Flash circuitry 79, which is registered and read by the midpoint sampling and signal characteristic calculation logic 78. Since there is a direct relationship between power and current, the average power received is also discernable by integrating the signal over time. The integrator function 77 operates similarly, with the period of integration a multiple of the clock period. The oscillator 82 feeding the PLL 75 can be made switchable to provide the ability to sync up to a number of different fiber optic protocols or speeds. The filter 81 shown in FIG. 9 could be configurable for various optic protocols (e.g., Fibre Channel 1 Gbit traffic requires a 797 MHz Bessel Thompson filter).

Referring again to FIG. 1, there are a number of logic schemes that can be used to determine the abscissa values, but provided below is a simple condition tree that yields the Y4, Y3, Y2, and Y1 values. This condition tree is usable in either the on-line monitor or as a hand-held unit. In the case of Fibre Channel, the sample and hold function must acquire six contiguous samples at full fiber speed to ensure that valid starting values are acquired prior to entering the body of this routine. Other protocols that are not based on 8b/10b code may require different sync up periods. Similarly, the device logic 78 from FIG. 9 can be in the host system or on the receiver, and can be in the form of software, hardware, firmware, an application specific integrated circuit (ASIC), or a state machine.

Step 1 Load initial Y4 and Y1 values,
   Acquire 6 contiguous samples, S1, S2, S3, S4, S5, S6
   Set Y4=S1
   Set Y1=S1
     For i in 2 3 4 5 6
     do
     If sample S(i)>Y4 then
       Y4-S(i)
     Else if sample S(i)<Y1 then
       Y1=S(i)
     fi
     done
   Set Y3=Y4
   Set Y2=Y1
   Step 2 Initialize count C.
   Set C=(number of samples to take)
Step 15 If Count>0, then Decrement count Step 14.
Step 16 Else calculate signal characteristics.
Step 3 Acquire sample (S).
Step 4 If S>Y4, then Y4=S Step 9 and test count Step 15.
Step 5 Else if S>Y3, then Discard Step 10 and test count Step 15.
Step 6 Else if $$S > \left[ \frac{(Y4 + Y1)}{2} \right],$$

then Y3 S Step 11 and test count Step 15.
Step 7 Else if S>Y2, then Y2=S Step 12 and test count Step 15.
Step 8 Else if S>Y1, then Discard S Step 13 and test count Step 15.
Step 17 Else Y1=S; test count Step 15.

The instrument runs until a sufficient number of samples are acquired, after which, the calculations for eye opening, noise, and jitter are generated and displayed on a digital readout (such as, but not limited to, a digital multimeter).

Figure 10:
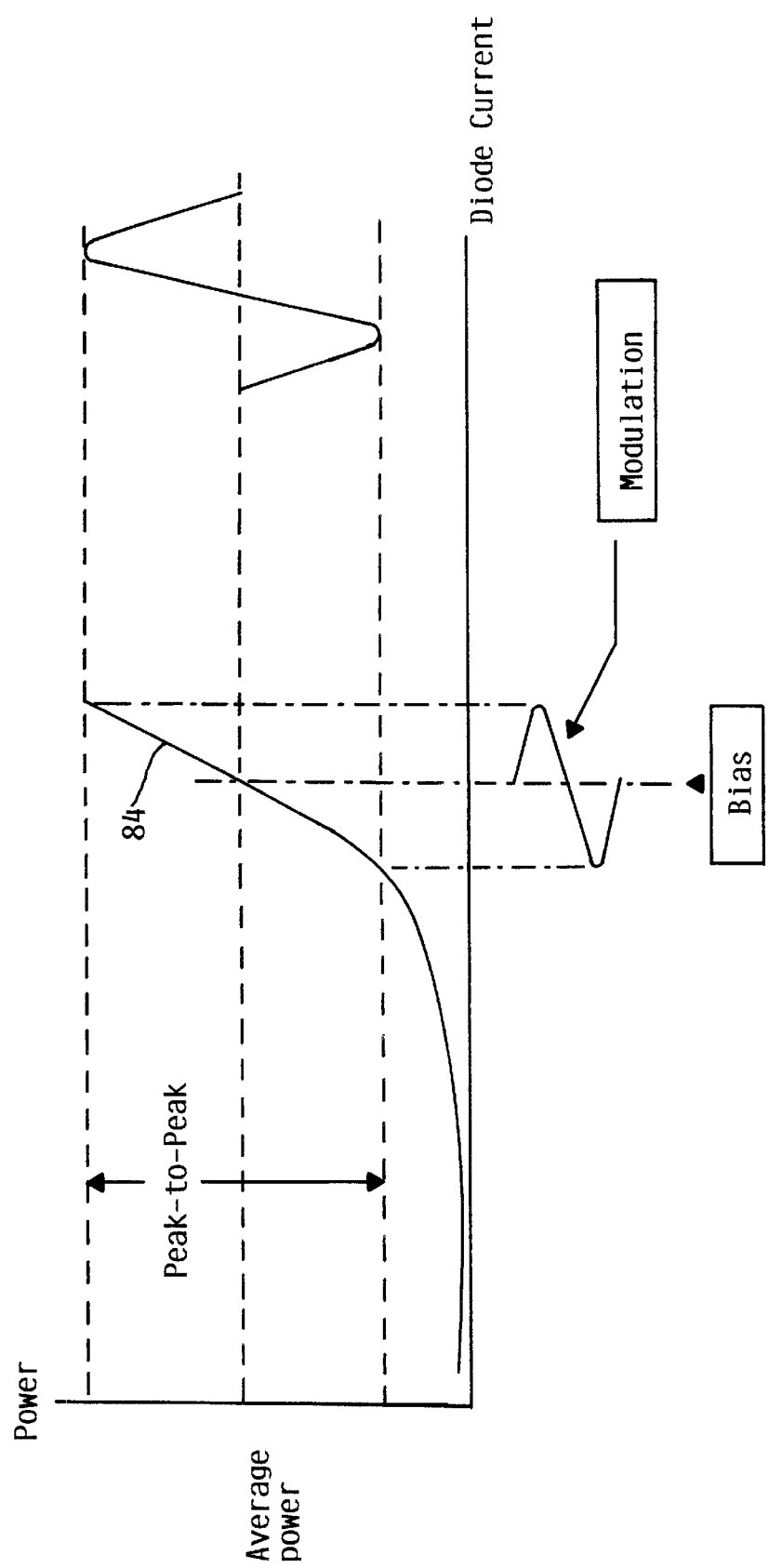
FIGS. 10–11 are graphs of slope efficiency.
Figure 11:
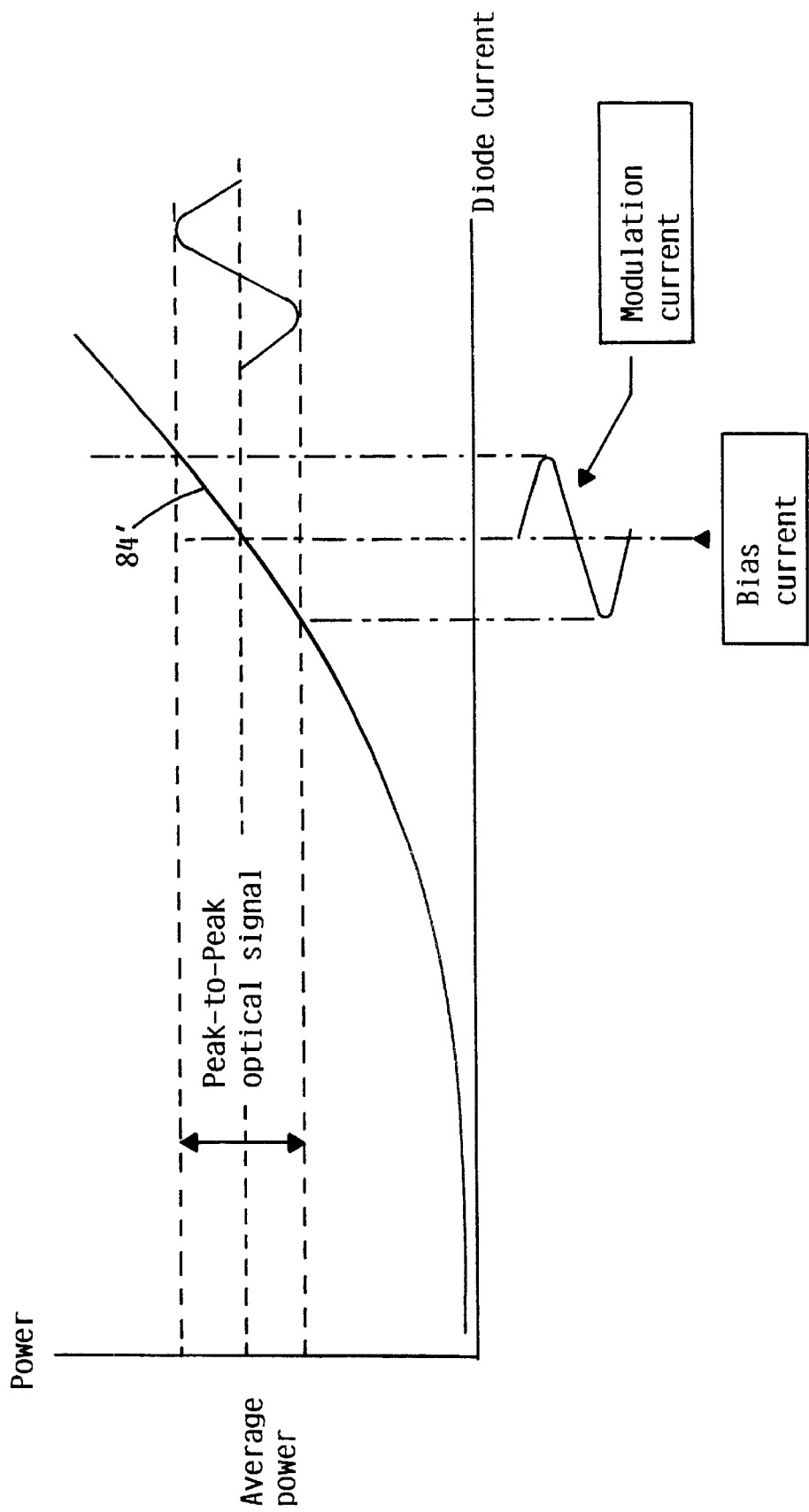

FIG. 10 is a light output power vs. applied current (diode current) graph for a laser diode. The bias current is applied in response to the level of average optical output power received in a feedback loop. The modulation amplitude is kept constant. The LI curve 84 reflects the quantum well efficiency of the diode. FIG. 11 depicts the characteristics of a diode that has degraded. The efficiency has reduced, which results in an increase in the bias current (due to the feedback loop). Modulation current is kept constant, but due to the lower slope of the LI curve 84' the optical output peak-to-peak swing has decreased. This lowered slope of LI curve 84' reflects the degraded performance of the diode. The present invention can be used to track the slope efficiency of a transmitter device such as a diode by using the Y4 and Y1 values. The difference (Y4−Y1) is the optical peak-to-peak value, which once collected can be monitored over time for signs of degradation.

Other measurements that are obtained by using the present invention include average power, peak power and peak-to-peak amplitude.

EXAMPLES

The following examples are included to further illustrate the present invention. In these examples, the geometric derivation is used.

Figure 6:
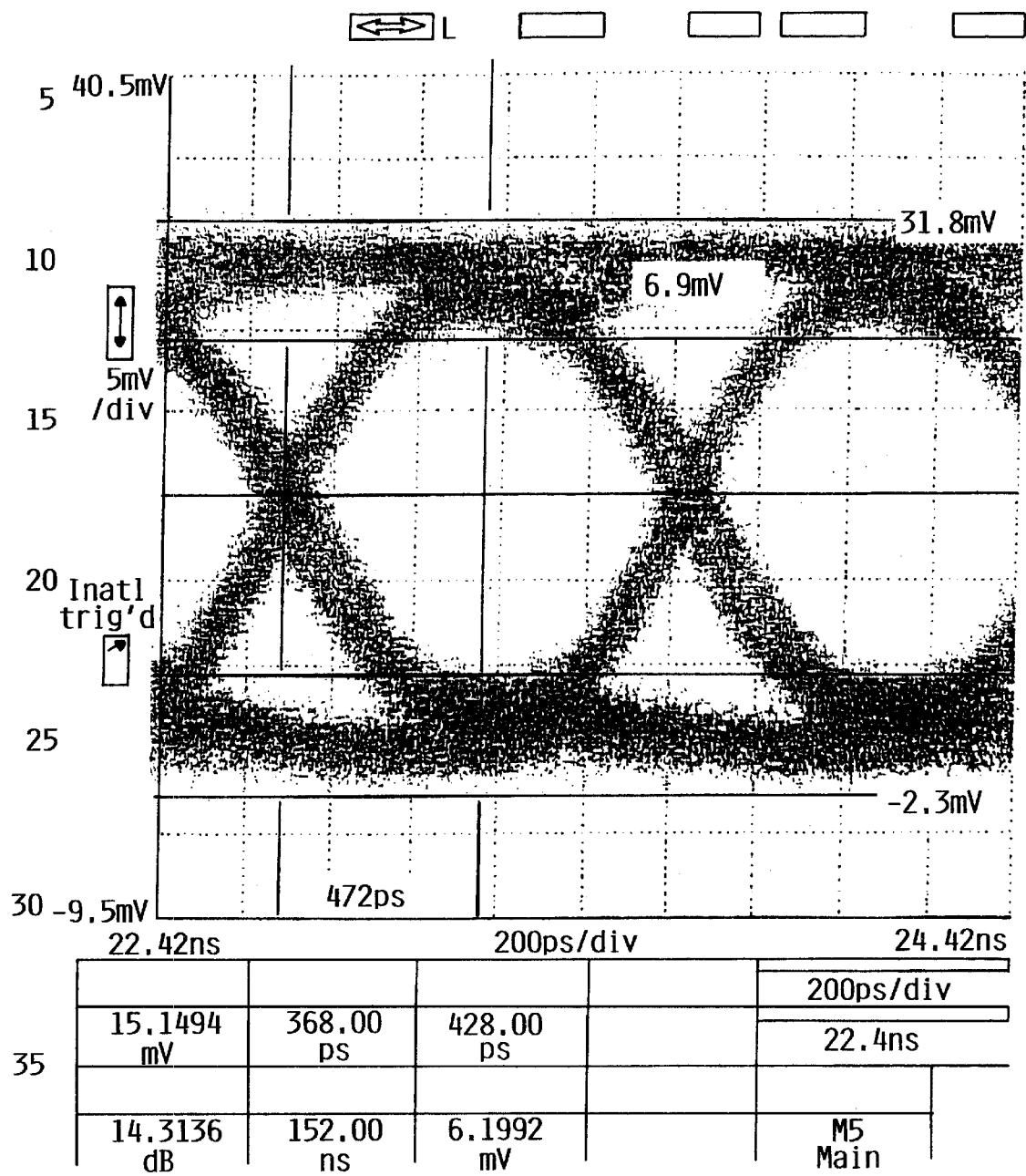
FIGS. 6–8 are waveforms taken by an oscilloscope used to illustrate the present invention.

FIG. 6 is a trace of a marginal telecommunications device with 152 ps of jitter (as measured with an oscilloscope). Using the geometric derivation:
   Jitter (calculated at high point)=470.5 ps*(6.9/17.05)= 190.4 ps
   Jitter (calculated at low point)=470.5 ps*(7.2/17.05)= 198.7 ps
   %eye(calculated at high point)=[1−2*(6.9/34.1)+(6.9)^2/(34.1)^2]*100=63.6%
   %eye(calculated at low point)=[1−2*(7.2/34.1)+(7.2)^2/(34.1)^2]*100=62.2%

In this example, the jitter value (worse case) given with the present invention is 198.7 ps. The %eye (worse case) calculates to be 62.2%, which is close to the Fibre Channel minimum of 57%. This telecommunications device would rate within the marginal range.

Figure 7:
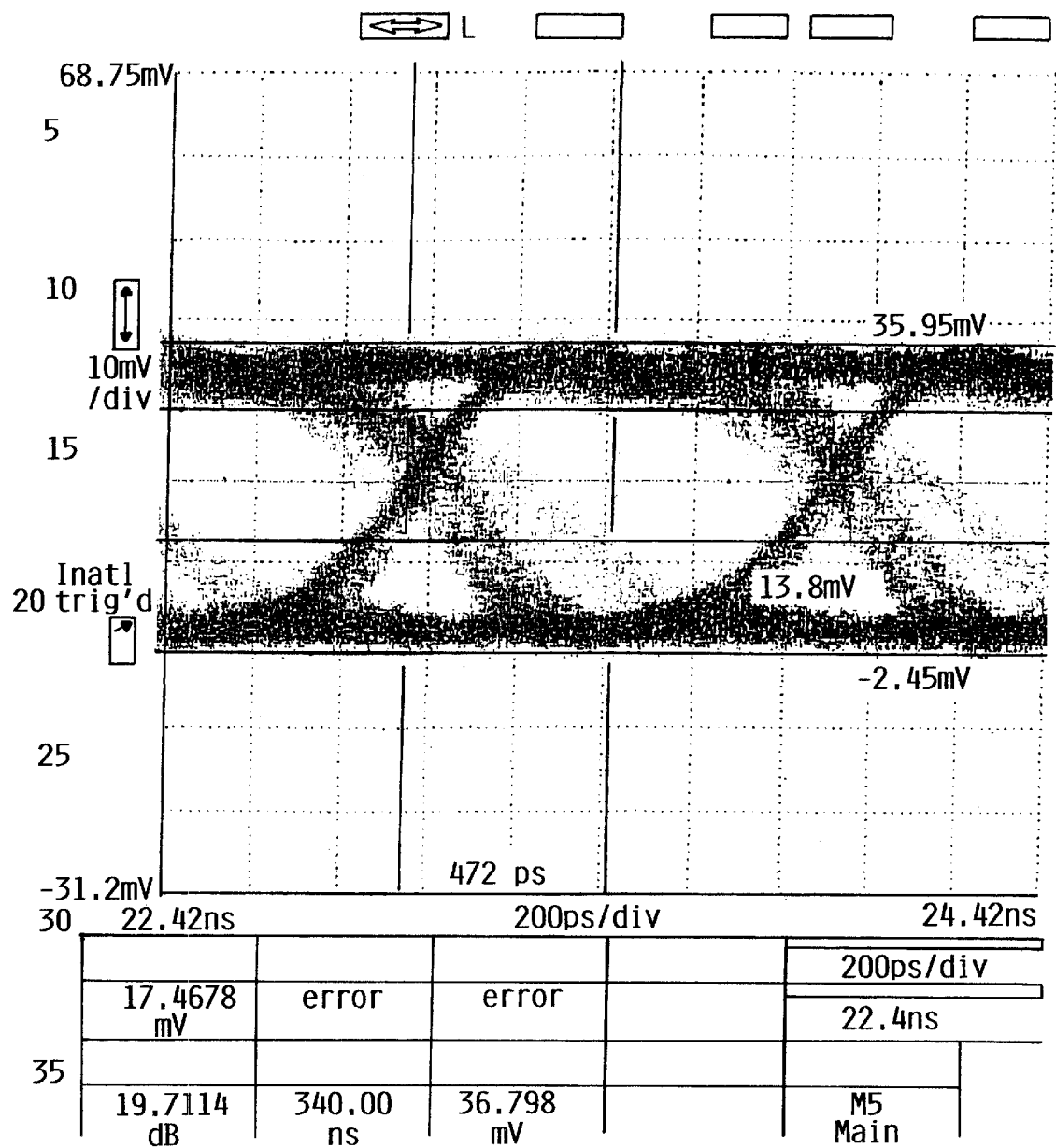

FIG. 7 is a trace of a known failing telecommunications device that measured 340 ps of jitter. Using the geometric derivation:
   Jitter (calculated at high point)=470.5 ps*(8.4/19.2)= 205.8 ps
   Jitter (calculated at low point)=470.5 ps*(13.8/19.2)= 338.2 ps
   %eye(calculated at high point)=[1−2*(8.4/38.4)+(8.4)^2/(38.4)^2]*100=61.0%

%eye(calculated at low point)=[1−2*(13.8/38.4)+(13.8)^2/(38.4)^2]*100=41.0%

In this example, the calculated eye opening (worse case) is 41.0%, which places the device in the failing range of eye opening.

Figure 8:
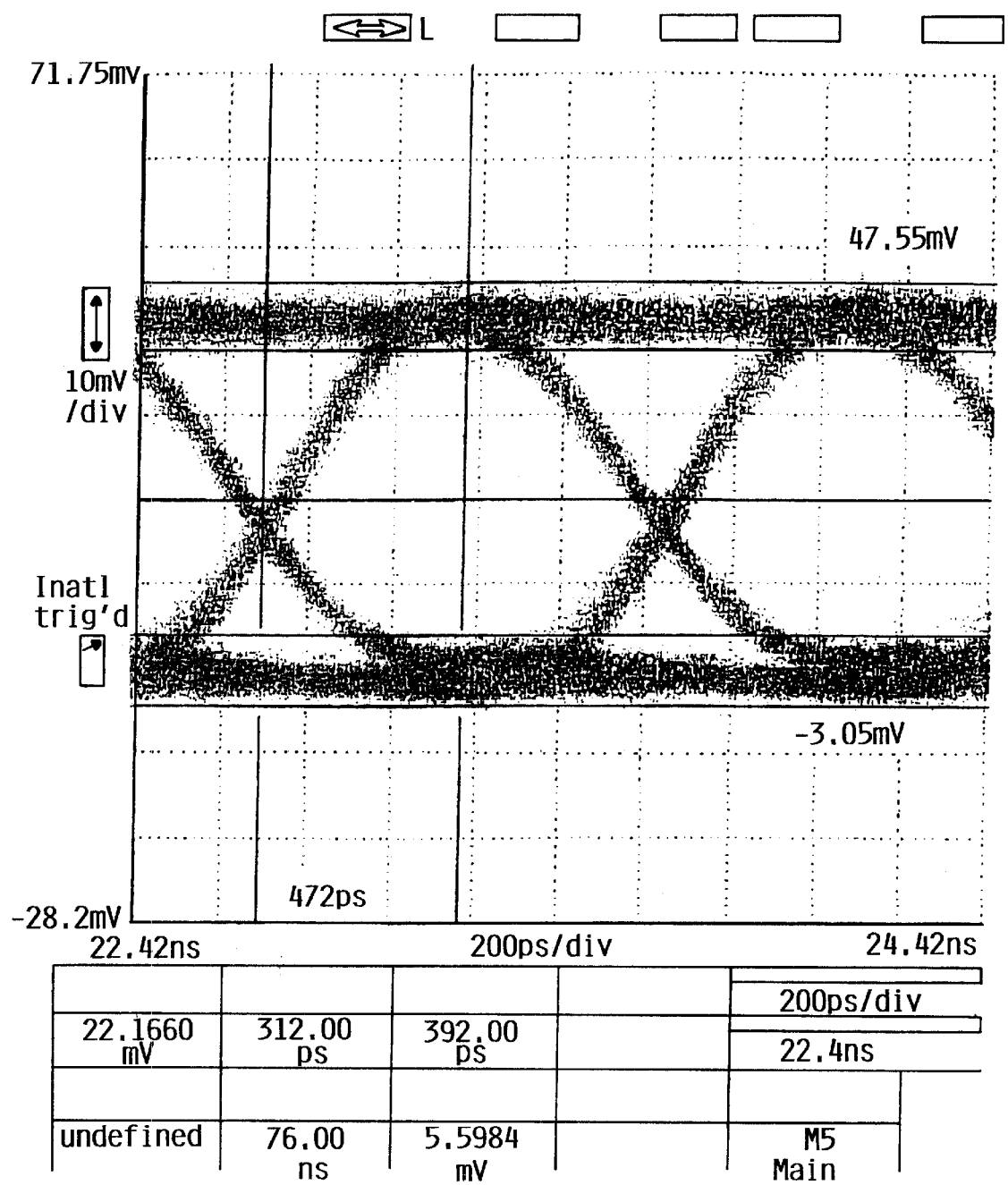

FIG. 8 is a trace of a known good telecommunications device that measured 76 ps of jitter. Using the geometric derivation:

Jitter (calculated at high point)=470.5 ps*(8.4/25.3)= 156.2 ps

Jitter (calculated at low point)=470.5 ps*(8.6/25.3)=159.9 ps

%eye (calculated at high point)=[1−2*(8.4/50.6)+(8.4)^2/(50.6)^2]*100=69.6%

%eye (calculated at low point)=[1−2*(8.6/50.6)+(8.6)^2/(50.6)^2]*100=68.9%

The high jitter value given by the present invention (159.9 ps) is due to the high noise level (8.6 mV). The %eye (worse case) calculates to be 68.9%, which is within the acceptable range of eye opening.

It will be appreciated that, although specific embodiments of the invention have been described herein for purposes of illustration, various modifications may be made without departing from the spirit and scope of the invention. In particular, the invention can be used as either a hand-held field device or as an in-line monitor. The display of signal characteristics can be either discrete or continuous, including numerical display and can be either or both visual and audible, or by a data signal transmitted to another electronic device. The signal characteristics can further be expressed in the form of ranges that indicate that the signal characteristic is within either a preferred range, a marginal range or a failure range. Further, the in-line monitor can be a combination of the host and a receiver or in the form of a transceiver alone. Accordingly, the scope of protection of this invention is limited only by the following claims and their equivalents.

We claim:

1. A method for measuring the signal characteristics of a telecommunications data stream, the method comprising the steps of:

obtaining at least one sample measurement at the midpoint of a waveform of the data stream; and determining at least one signal characteristic of the data stream based upon the sample measurement, wherein the signal characteristic is selected from the group consisting of: eye opening; jitter; noise; average power; peak-to-peak amplitude; and slope efficiency.

2. The method of claim 1, further comprising the step of:
   producing a first indication if the signal characteristic is within a first range.

3. The method of claim 2, wherein the step of producing the first indication comprises presenting a visual or audible indication.

4. The method of claim 2, wherein the step of producing the first indication comprises transmitting a data signal.

5. The method of claim 2, wherein the first range corresponds to a preferred range.

6. The method of claim 2, further comprising the steps of:
   producing a second indication if the signal characteristic is within a second range; and
   producing a third indication if the signal characteristic is within a third range.

7. The method of claim 6, wherein
   the first range corresponds to a preferred range;
   the second range corresponds to a marginal range; and
   the third range corresponds to a failure range.

8. The method of claim 1, wherein the signal characteristic is expressed as a percentage.

9. The method of claim 1, wherein the signal characteristic is numerically displayed.

10. An apparatus for a telecommunications data stream, the apparatus comprising:

means for obtaining at least one sample measurement at the midpoint of a waveform of the data stream; and means for determining at least one signal characteristic of the data stream based upon the sample measurement, wherein the signal characteristic is selected from the group consisting of: eye opening; jitter; noise; average power; peak-to-peak amplitude; and slope efficiency.

11. The apparatus of claim 10, further comprising:
    means for producing a first indication if the signal characteristic is within a first range; and
    means for producing a second indication if the signal characteristic is within a second range.

12. The apparatus of claim 11, further comprising:
    means for producing a third indication if the signal characteristic is within a third range.

13. The apparatus of claim 12, wherein
    the first range corresponds to a preferred range;
    the second range corresponds to a marginal range; and
    the third range corresponds to a failure range.

14. An apparatus for a telecommunications data stream, the apparatus comprising:

an analog to digital converter;

a clock recovery unit;

a midpoint sampler responsive to the analog-to-digital converter and clock recovery unit; and a signal characteristic calculator responsive to the midpoint sampler.

15. The apparatus of claim 14, wherein the signal characteristic is selected from the group consisting of:
    eye opening;
    jitter;
    noise;
    average power;
    peak-to-peak amplitude; and
    slope efficiency.

16. The apparatus of claim 14, further comprising:
    a first indicator responsive to the signal characteristic being within a first range.

17. The apparatus of claim 16, wherein the first indication comprises visual or audible indication.

18. The apparatus of claim 16, wherein the first indicator comprises a data signal.

19. The apparatus of claim 16, further comprising:
    a second indicator responsive to the signal characteristic being within a second range; and
    a third indicator responsive to the signal characteristic being within a third range.

20. The apparatus of claim 19, wherein
    the first range corresponds to a preferred range;
    the second range corresponds to a marginal range; and
    the third range corresponds to a failure range.

21. The apparatus of claim 14, wherein the apparatus is contained in a receiver.

22. The apparatus of claim 14, wherein the apparatus is distributed between a receiver and a host system.

23. The apparatus of claim 14, wherein the signal characteristic is numerically displayed.

24. The apparatus of claim 14, wherein the clock recovery unit is selected from a group comprising:

a phased locked loop circuit; and
a serializer/deserializer circuit.

* * * * *